(12) United States Patent  (10) Patent No.: US 8,961,166 B2
Wu et al.  (45) Date of Patent: Feb. 24, 2015

(54) APPARATUS FOR MANUFACTURING LIGHT GUIDE FILM

(75) Inventors: Zhihua Wu, Suzhou (CN); Xiachong Zhou, Suzhou (CN); Zongbao Fang, Suzhou (CN); Su Shen, Suzhou (CN); Guojun Wei, Suzhou (CN); Donglin Pu, Suzhou (CN); Linsen Chen, Suzhou (CN)

(73) Assignees: SVG Optronics Co., Ltd., Suzhou, Jiangsu (CN); Suzhou University, Suzhou, Jiangsu (CN)

( * ) Notice: Subject to any disclaimer, the term of this patent is extended or adjusted under 35 U.S.C. 154(b) by 0 days.

(21) Appl. No.: 13/583,290

(22) PCT Filed: Dec. 13, 2010

(86) PCT No.: PCT/CN2010/079736
§ 371 (c)(1),
(2), (4) Date: Sep. 7, 2012

(87) PCT Pub. No.: WO2012/006854
PCT Pub. Date: Jan. 19, 2012

(65) Prior Publication Data
US 2013/0040011 A1  Feb. 14, 2013

(30) Foreign Application Priority Data
Jul. 13, 2010 (CN) .......................... 2010 1 0224529

(51) Int. Cl.
*B29D 7/00* (2006.01)
*B32B 38/06* (2006.01)
*B32B 37/20* (2006.01)
*F21V 8/00* (2006.01)
*B29C 59/04* (2006.01)

(52) U.S. Cl.
CPC ............... *B32B 38/06* (2013.01); *B32B 37/203* (2013.01); *G02B 6/0065* (2013.01); *B29C 59/04* (2013.01); *B32B 2551/00* (2013.01); *B32B 2590/00* (2013.01); *G02B 6/0036* (2013.01)
USPC ........... 425/365; 425/505; 264/1.34; 264/1.6; 264/175; 264/284

(58) Field of Classification Search
USPC ........... 264/1.34, 1.6, 175, 284; 425/505, 365
See application file for complete search history.

(56) References Cited

U.S. PATENT DOCUMENTS

| 3,684,603 | A | * | 8/1972 | Iltis ............................... 156/152 |
| 4,231,830 | A | * | 11/1980 | Ryan et al. .................... 156/232 |
| 4,259,286 | A | * | 3/1981 | Louis et al. ................... 264/555 |
| 4,486,363 | A | * | 12/1984 | Pricone et al. ................. 264/1.36 |
| 5,308,235 | A | * | 5/1994 | Kamitakahara et al. ....... 425/194 |
| 5,624,520 | A | * | 4/1997 | Nedblake et al. ............. 156/152 |
| 8,071,123 | B2 | * | 12/2011 | Hayashi et al. ............... 424/443 |
| 2006/0062830 | A1 | * | 3/2006 | Hayashi et al. ............... 424/443 |

* cited by examiner

*Primary Examiner* — Timothy Kennedy
*Assistant Examiner* — David N Brown, II
(74) *Attorney, Agent, or Firm* — Houtteman Law LLC

(57) ABSTRACT

An apparatus for manufacturing a light guide film may comprise a feed roller, a receiving roller, a separating device, a hot press printing device and a recombining device. Firstly, the separating device may separate a protective layer from a substrate layer of the light guide film. Secondly, a surface of the substrate layer to be manufactured may be impressed with light guide dots by the hot press printing device, and the recombining device recombine the peeled protective layer to the substrate layer. And lastly, the finished light guide film is recycled by the receiving roller. The apparatus may have advantages such as high output and low cost, and it may manufacture a large dimensioned product.

10 Claims, 5 Drawing Sheets

APPARATUS FOR MANUFACTURING LIGHT GUIDE FILM

FIELD

The present disclosure relates to an apparatus for manufacturing a light guide film, more particularly to an apparatus for manufacturing a light guide film that use roll-to-roll hot press printing.

BACKGROUND ART

Light guide plate is one of key components in a backlight module of a LCD display, mobile phone, digital camera and illumination etc. Currently, the method for manufacturing the light guide plate can be divided into printing and non-printing. In printing, a printing material which is highly astigmatic, such as $SiO_2$ and $TiO_2$ etc., is distributed properly at a bottom surface of the light guide plate. Due to properties of light absorption and light diffusion of the printing material, internal transmission induced by optical total reflection is broken up, and the light is emitted from the front face and distributed evenly at a light emitting area. In non-printing, a molding member having a predetermined pattern is prepared first, and the pattern is formed on the light guide plate via injection molding, and the light is guided by the pattern which is distributed evenly on the light emitting area. Currently, the light guide plates of the backlight modules for displaying in current mainstream products are substantially made in the non-printing manner via injection molding, i.e., via plastic injection molding, and the light guide plates are substantially acryl plate with a thickness of about 0.5-2.0 mm.

Currently, display devices are heading in a lighter and slimmer direction, and the backlight module is required in a similar way. And LED is gradually used in the backlight source. When a volume of the backlight source is reduced, the light guide plate has to be thinner before the display device may become slimmer. Generally, normal light guide plate has a thickness of about 1.0 mm. However, with the requirement from the market and by the technology, the thickness thereof is reduced gradually up to 0.5 mm. Due to the reduction of the thickness, some problems may be raised during manufacturing of the light guide plate. If conventional injection molding is adopted for forming the slim light guide plate, an injection molding machine with a high injection velocity may be required for forming a super slim light guide film. However, there is a strict surface quality requirement by the super slim light guide film. Therefore, a stricter requirement on temperature control and environment may be presented. For the conventional injection molding, yield and capacity problems may be raised to increase the cost accordingly if the light guide film with high quality may be manufactured. Currently, few countries are dedicated to the research on methods and processes for manufacturing super slim light guide film. For example, Japanese proposes an ink injection method for forming the light guide plate by injecting resin material from an ink injector to delineate on a lens, with a minimum thickness up to 50 um. However, diameters of dots formed in ink injecting manner are limited to 20-120 um, and the dots are substantially in microlens shape. And the groove configuration, depth and shape of the dots can hardly be varied.

In viewing thereof, there is an urgent need in obtaining a super slim light guide film with high quality, high yield rate and low cost etc.

SUMMARY

An object of the present invention lies in that a roll-to-roll apparatus for manufacturing a light guide film may be provided, so that conventional flat pressing device with low efficiency and high cost may be overcome, meanwhile conventional injection molding device which cannot manufacture a large-sized super slim light guide film may be overcome as well.

An apparatus for manufacturing a light guide film according to an object of the present invention may comprise a feeding roller and a receiving roller disposed at both ends of the apparatus respectively; a separating device disposed behind the feeding roller for separating the protective layer from the substrate layer to expose a surface to be processed of the substrate layer; a hot press printing device having a pressing roller and an imprinting roller which is provided with a molding member for processing the light guide film, the molding member having a surface formed with a microstructure which is impressed onto the surface to be processed of the substrate layer to form light guide dots thereon via cooperation of the pressing roller with the imprinting roller; and a recombining device disposed behind the hot press printing device for recombining the protective layer separated by the separating device to the substrate layer impressed. The roll of the raw material is released from the feeing roller, then passes through the separating device, the hot press printing device and the recombining device, and reeled by the receiving roller.

According to an apparatus for manufacturing a light guide film to achieve an object of the present invention, the microstructure on the molding member is a micro/nano structures in a raster shape or a cylindrical microlens structure.

According to an apparatus for manufacturing a light guide film to achieve an object of the present invention, both ends of the molding member are inserted into a gap formed in the imprinting roller such that the molding member is attached to the imprinting roller and extended circumferentially around the imprinting roller by 360 degrees.

According to an apparatus for manufacturing a light guide film to achieve an object of the present invention, each of two ends of the molding memberlight guide model is provided with a fixture, and the molding member is fixed around the imprinting roller with the fixtures and extended circumferentially around the imprinting roller by 180 degrees.

According to an apparatus for manufacturing a light guide film to achieve an object of the present invention, the pressing roller comprises a first pressing roller and a second pressing roller which are provided at two sides of the imprinting roller respectively. And a first impression area formed on the light guide film by the cooperation of the first pressing roller and the printing roll and a second impression area formed on the light guide film by the cooperation of the second pressing roller and the printing roll are complementary with each other to form successive light guiding dots on the light guide film.

According to an apparatus for manufacturing a light guide film to achieve an object of the present invention, the separating device further comprises: a trimmer for cutting off redundant edges of the protective layer; and a recycling roller for recycling the edges cut off.

According to an apparatus for manufacturing a light guide film to achieve an object of the present invention, the hot press printing device further comprises a pressure control system which controls the pressure between the pressing roller and the imprinting roller.

According to an apparatus for manufacturing a light guide film to achieve an object of the present invention, the hot press printing device further comprises a temperature control system which heats and controls a heating temperature of the pressing roller and the imprinting roller.

According to an apparatus for manufacturing a light guide film to achieve an object of the present invention, it further comprises: a front and rear correction systems having edge sensors disposed on the feed roller and the receiving roller respectively and a transport correction device connected with axes of the feed roller and the receiving roller respectively. The transport correction device control the feeding roller or the receiving roller to move inwardly when the raw material is sensed by the edge sensors to offset inwardly, and to move outward when the raw material is sensed by the edge sensors to offset outwardly.

According to an apparatus for manufacturing a light guide film to achieve an object of the present invention, it further comprises: a tension control system comprising a tension sensing device and a magnetic powder clutch device. When the tension sensing device detects that a tension of the light guide film during transportation is larger than a predetermined value, a rotating speed of the receiving roller is reduced by controlling the clutch device, and when the tension is less than the predetermined value, the rotating speed is increased by controlling a speed control device of the apparatus.

Compared with conventional methods, the method disclosed in the present invention may possess the following advantages: because a roll-to-roll nano-scaled press printing is adopted, the dimension manufactured may be large with reduced thickness compared with injection molding. With the roll-to-roll nano-scaled press printing in the present invention, compared with flat pressing, the manufacturing efficiency thereof is increased tremendously with stable pressing process, high consistency of the whole roll and an enhanced yield rate larger than 95%. In addition, it is easier to control with lowered requirement on temperature and environment when compared with the injection molding and ink injecting process.

In the following, concrete embodiments will be described in detail with reference to accompanying figures.

BRIEF DESCRIPTION OF THE DRAWINGS

These and other aspects and advantages of embodiments of the present disclosure will become apparent and more readily appreciated from the following descriptions made with reference the accompanying drawings, in which.

DETAILED DESCRIPTION

The Apparatus for manufacturing a light guide film of the present invention is one for forming light guide dots on raw material of the light guide film rolled into a cylindrical shape in a roll-to-roll nanoscaled press printing manner. The raw material of the light guide film comprises a substrate layer and a protective layer. During manufacturing, the protective layer is peeled off first to expose a surface of the substrate layer to be processed. Then, press printing is performed to the surface for manufacturing. In the following, concrete embodiments will be described in detail for a better understanding of the present invention.

First Embodiment

Figure 1:
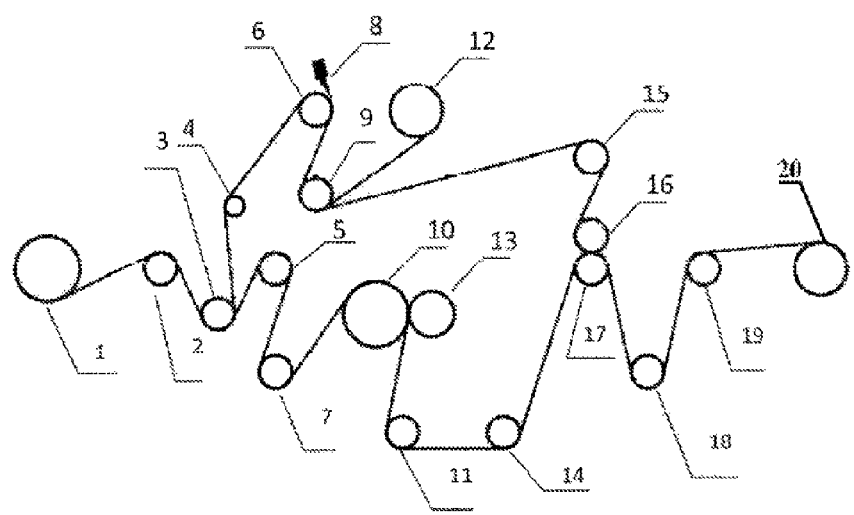
FIG. 1 is a schematic view of an apparatus for manufacturing a light guide film according to a first embodiment of the present invention.

Referring to FIG. 1, an apparatus for manufacturing a light guide film according to a first embodiment of the present invention is shown. As shown, the apparatus may comprise a feeding roller 1, a receiving roller 20, a separating device, a hot press printing device and a plurality of auxiliary rollers 2, 4, 5, 7, 9, 11, 14, 15 and 18. The raw material of the light guide film is disposed on the feeding roller 1, and it is recycled by the receiving roller 20 after passing through the separating device, the hot press printing device, the recombining device, and the plurality of auxiliary rollers. It should be noted that the number and arrangements of the plurality of the auxiliary rollers may be designed according to practical needs, which are not mandatorily necessary.

The separating device is disposed behind the feeding roller 1. And the separating device comprises a separating roller 3, a trimming roller 6, a trimmer 8 and a recycling roller or receiving roller 12. The protective layer and the substrate layer of the raw material are separated at the separating roller 3. And residual edges of the protective layer are cut off by the trimmer 8 at the trimming roller 6 after it passes through the auxiliary roller 4. And the residual edges are recycled at the receiving roller 12. The protective layer after trimming continues to be transported by the auxiliary roller 15, and it is coated on the substrate layer again at the recombining device. After the substrate layer and the protective layer are separated, the surface to be manufactured is exposed, which is impressed by the hot press printing device to form the light guide dots thereon.

The hot press printing device comprises a pressing roller 10 and an imprinting roller 13. The pressing roller 10 may be a steel roller or a plastic roller, and the imprinting roller 13 may be a mirror roller. A molding member for manufacturing the light guide film may be disposed on the imprinting roller 13, and the molding member may be formed with microstructure on a surface thereof. The pressing roller 10 cooperates with the imprinting roller 13 to impress the microstructure of the molding member to the surface to be processed of the substrate layer to form the light guide dots.

Figure 2:
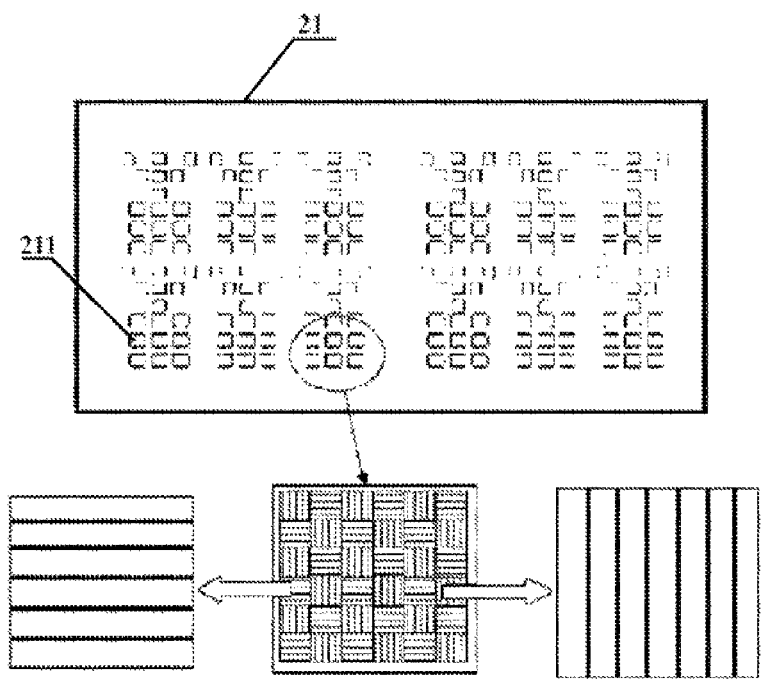
FIG. 2 is a schematic view showing a surface structure of a molding member according to an embodiment of the present invention.
Figure 3:
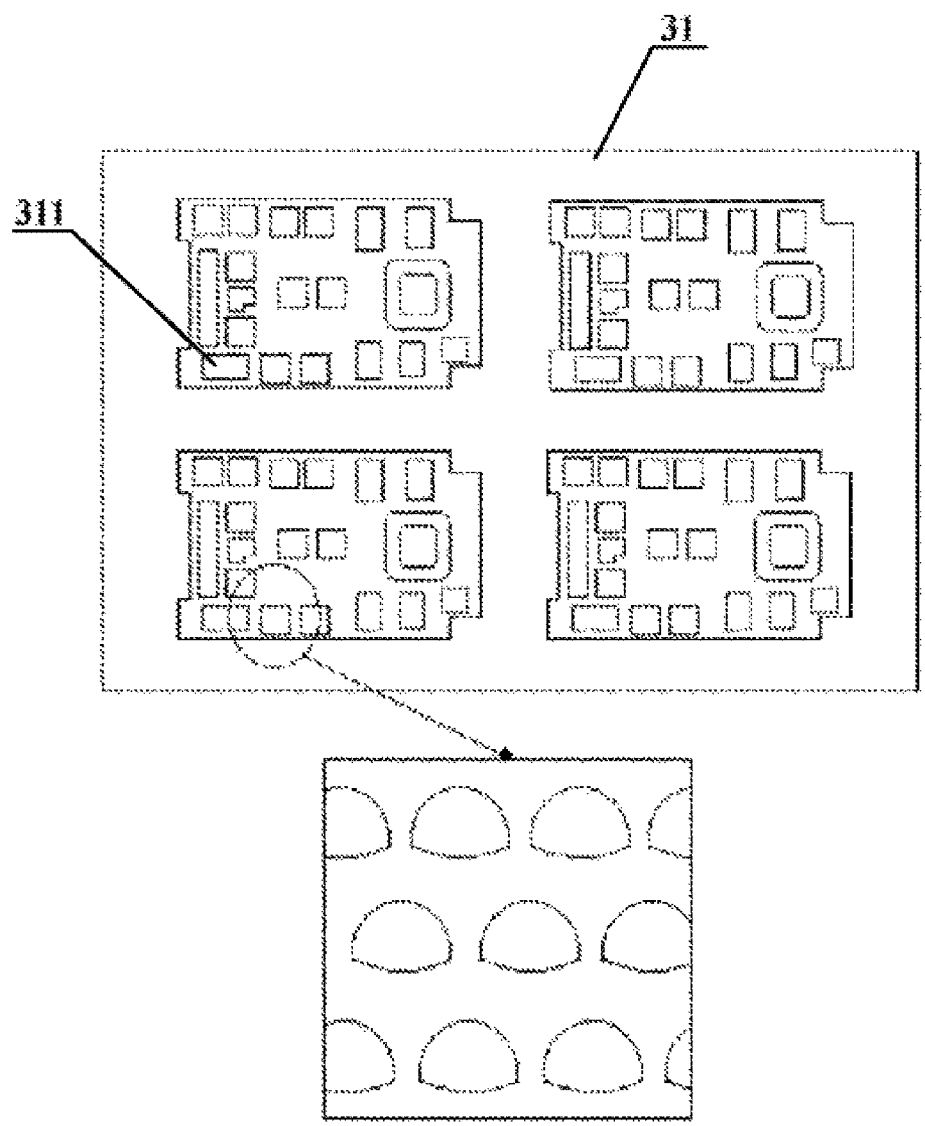
FIG. 3 is a schematic view showing a surface structure of a molding member according to another embodiment of the present invention.

Referring to both FIGS. 2 and 3, schematic views of the microstructure on the surface of the molding member are shown respectively. As shown, depending on the application field of the light guide film, when uniform light emission is required, the microstructure on the surface of the molding member 21 may be arranged based on distance to the light source, and the microstructure may be in a raster shape 211 which may facilitate the light uniformity of the light emitting face. When light may be emitted from only a part of the light guide film, the microstructure of the surface of the molding member 31 may be designed on the part of the light guide film where light emission is needed. And at this time, the microstructure may be formed into a cylindrical microlens structure 311 to increase light emission. The molding member mentioned above may be made of nickel aluminum etc.

Figure 4:
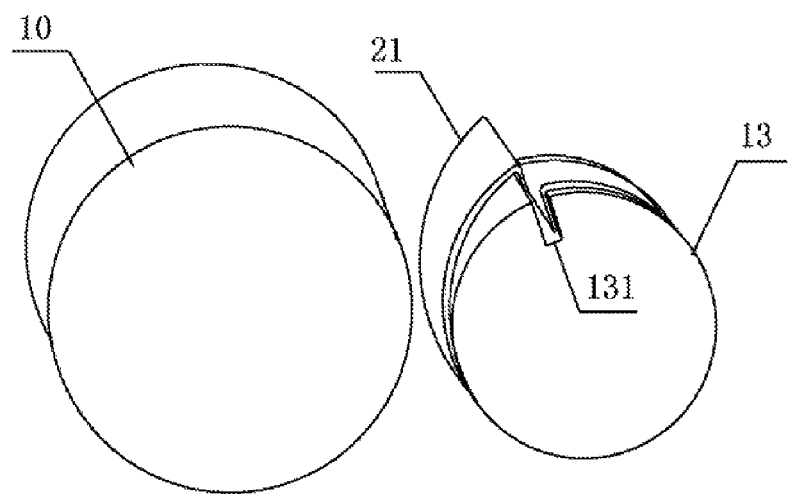
FIG. 4 is a schematic view of installing a molding member according to an embodiment of the present invention.

Referring to FIG. 4 again, a schematic view showing the installation of the molding member is shown. Both ends of the molding member are inserted into a gap 131 formed in the imprinting roller such that the molding member is attached to the imprinting roller and extended circumferentially around the imprinting roller by 360 degrees. During installation, an end of the molding member is inserted into the gap 131. In one embodiment, the end is inserted into a bottom of the gap 131. And the molding member may be pressed by, for example, a left hand so that the molding member may not leave the bottom of the gap 131. Then the molding member is softly bent by the right hand with the left hand softly pulling a top end of the molding member. Then the pressing roller 10 is controlled step by step via the right hand to rotate 360 degrees. And the other end of the molding member is inserted into the gap 131 of the imprinting roller 13. Then, the pressing roller 10 is rotated to push the top end of the molding member into the gap 131, and it is further rotated by two or three circles so that the molding member is closely attached to the imprinting roller 13.

Preferably, the hot press printing device further comprises a pressure control system and a temperature control system. The pressure control system may be a gas pressure or hydraulic one which is connected with the pressing roller 10 to drive the pressing roller 10 and control the pressing force between the pressing roller 10 and the printing plate 13. The temperature control system is provided on the imprinting roller 13 or the pressing roller 10, and it may be a resistor heating device or an infrared heating device. During impressing, the imprinting roller 13 or the pressing roller 10 may be heated by the temperature control system and the heating temperature is controlled by the temperature control system so that optimal impression may be implemented.

After impression, the substrate layer is transported to the recombining device. The recombining device comprises two pressing rollers 16 and 17 which register and press the protective layer from the separating device and the substrate layer from the press printing device again to form a completed light guide film. Finally, the finished light guide film is reeled at the receiving roller 20.

Figure 5:
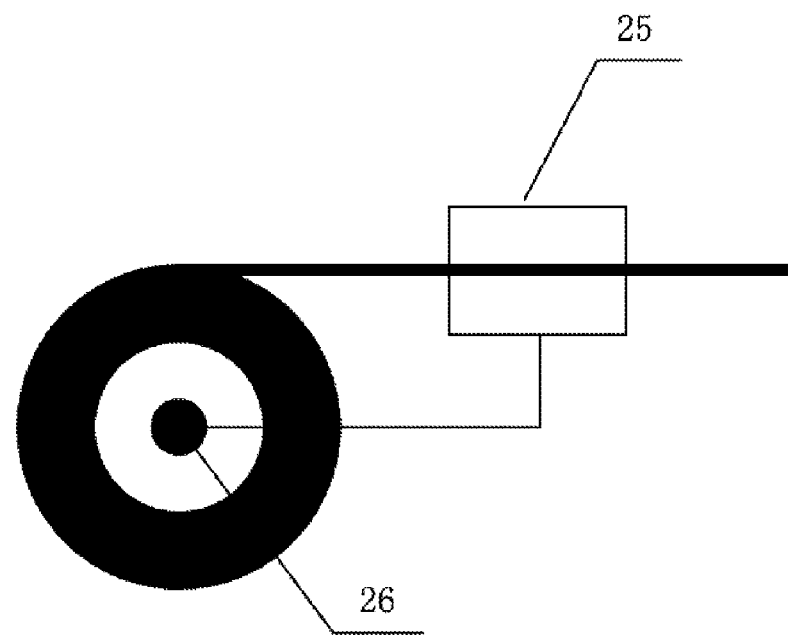
FIG. 5 is a schematic view of a correction system in an apparatus for manufacturing a light guide film according to an embodiment of the present invention.

Preferably, front and rear correction systems are disposed on the feeding roller 1 and the receiving roller 20. As shown in FIG. 5, the correction system each comprises a material edge sensor and a transport correction device. The material edge sensor may be an infrared sensing device 25. And the transport correction device is provided with axial displacement devices 26 on the feeding roller 1 and the receiving roller 20 respectively, and the infrared sensing device 25 and the axial displacement devices 26 are electrically connected respectively. When the raw material is detected to be offset inwardly by the infrared sensing device 25 during transportation, the axial displacement device 26 controls the feeding roller 1 or the receiving roller 20 to move inwardly, and to move outwardly when the raw material is sensed by the edge sensors to offset outwardly. Both of the correction systems ensure that front and rear displacement errors are within 30 um during transporting of the light guide film, so that registering step may be omitted to enhance impressing quality.

Preferably, a roll releasing tension sensor may be disposed adjacent to the auxiliary roller 2 of the feeding roller 1, and a roll winding tension sensor may be disposed adjacent to the auxiliary roller 19 of the receiving roller 20. Meanwhile, rotating speed control devices may be disposed on the feeding roller 1 and the receiving roller 20 which may be connected with the tension sensors mentioned above. When the tension sensor detects that a tension of the light guide film during transportation is larger than a predetermined value, the rotating speed control device may function to decrease the roll winding rotate speed, and when the tension is less than the predetermined value, the winding rotate speed may be increased via the function of the rotating speed control device. The predetermined value may be a rated deformation value of the light guide film or other numerals that may influence the surface tension of the light guide film. By controlling the tension of the light guide film during transportation, the light guide film may be ensured to be in a tightening state, thus avoiding rejected products caused by wrinkles and enhancing yield rate accordingly.

Second Embodiment

Figure 6:
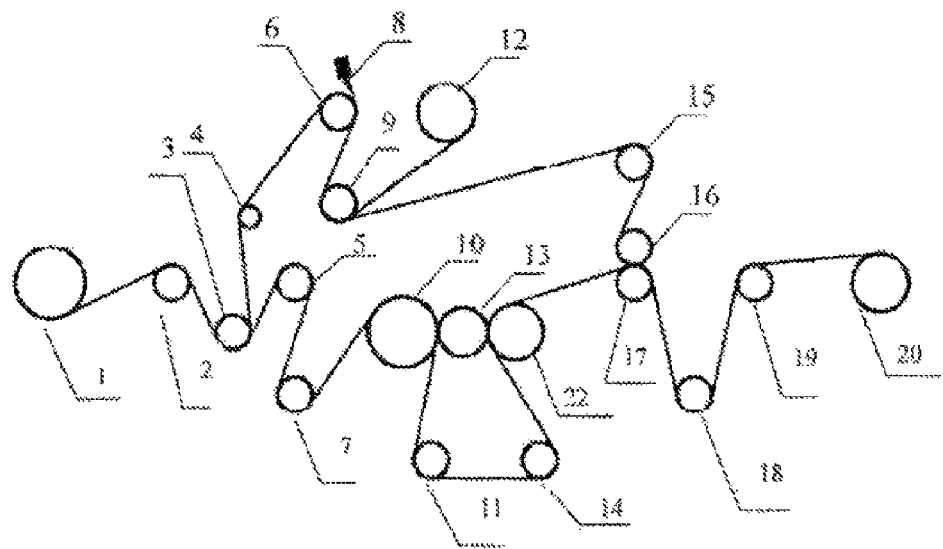
FIG. 6 is a schematic view of an apparatus for manufacturing a light guide film according to a second embodiment of the present invention.

FIG. 6 is a schematic view of an apparatus for manufacturing a light guide film according to a second embodiment of the present invention. In this embodiment, except the press printing device, other components or devices are the same or similar to those in the first embodiment. Therefore, detailed description related thereto is hereby omitted for clarity purpose.

In the press printing device, the molding member for processing the light guide film is fixed onto the imprinting roller 13 with fixtures and extended circumferentially around the imprinting roller by 180 degrees, i.e., only half of the imprinting roller 13 is overlapped with the molding member. Therefore, during impressing, two pressing rollers may be needed to perform front and rear press printing respectively. Compared with the impressing effect in the first embodiment, because there is a gap in the pressing roller of the first embodiment, there are periodic interrupts during the impressing of the light guide dots. However, in this embodiment, with only simple design, an impression area formed on the light guide film by the cooperation of the first pressing roller 10 and the imprinting roller 13 and an impression area formed on the light guide film by the cooperation of the second pressing roller 22 and the imprinting roller 13 are complementary with each other to impress continuous light guiding dots on the light guide film.

Figure 7:
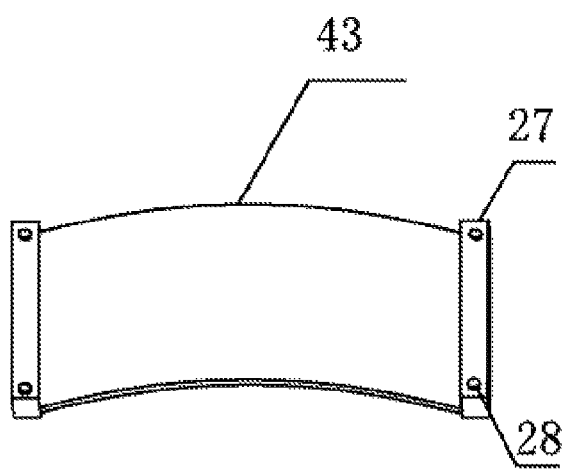
FIG. 7 is a schematic view of a molding member according to a second embodiment of the present invention.
Figure 8:
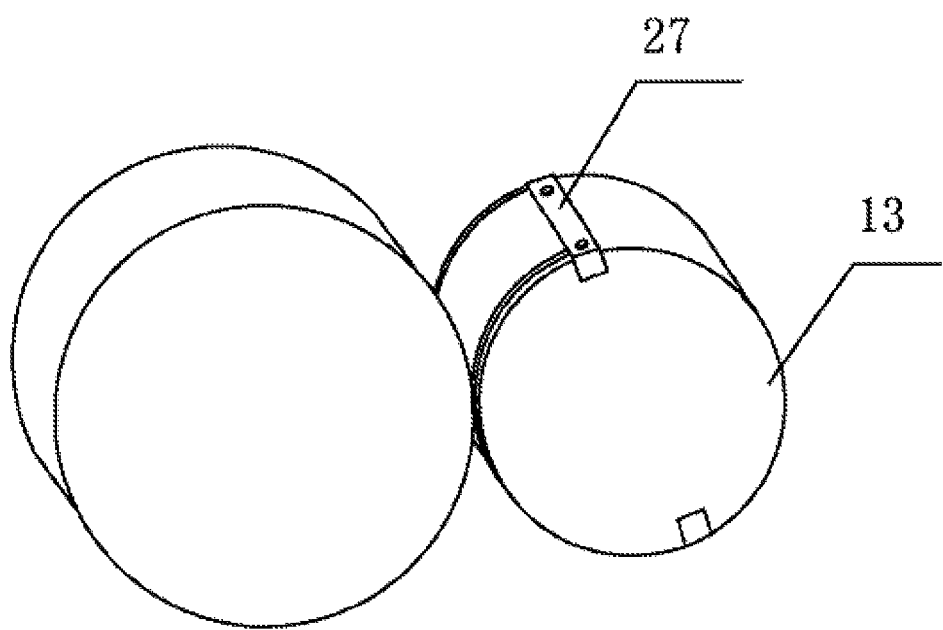
FIG. 8 is a schematic view of installing a molding member according to a second embodiment of the present invention.

FIG. 7 is a schematic view of a molding member according to a second embodiment of the present invention, and FIG. 8 is a schematic view of installing a molding member according to a second embodiment of the present invention. As shown, both ends of the molding member 43 are provided with fixtures 27 which are provided with a plurality of threading holes 28 respectively. And the edges of the imprinting roller 13 are formed with grooves corresponding to the fixtures 27 and threading holes corresponding to the threading holes 28. During installation, the molding member is fixed via the fixtures 27 as shown in FIG. 7, and one side of the fixture is fixed into the groove at the edge of the imprinting roller, at this time, only one fixing screw is used to lock with the middle threading hole of the fixture 27 without screwing tight. Then, the fixture at the other side of the molding member is pulled, and the imprinting roller 13 is rotated until another groove of the imprinting roller 13 is facing upward, and the screw locks another threading hole of the fixture, at this time the screw is not tightened. And the remaining screws are put into the corresponding remaining threading holes. And the fixtures 27 are uniformly pulled tight so that the molding member is attached closely to the surface of the imprinting roller 13 without wrinkles. And finally all the screws are fixed to finish the installing of the molding member.

In all, the present invention discloses an apparatus for manufacturing a light guide film using roll-to-roll nano press printing with the characteristics of rapid production having increased size and lowered cost. In addition, two correction systems and a tension control system are used so that the yield rate is increased and the quality of the light guide film is enhanced.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. An apparatus for manufacturing a light guide film, a raw material of the light guide film being rolled into a roll and including a substrate layer and a protective layer, the apparatus comprising:
    a feeding roller on which the roll of the raw material is disposed and a receiving roller disposed at both ends of the apparatus respectively;
    a separating device disposed behind the feeding roller for separating the protective layer from the substrate layer of the raw material released from the feeding roller to expose a surface to be processed of the substrate layer;
    a hot press printing device disposed behind the separating device, configured for forming light guide dots on the exposed surface of the substrate layer coming from the separating device, having a pressing roller and an imprinting roller which is provided with a molding member for processing the light guide film, the molding member having a surface formed with a microstructure to be impressed onto the exposed surface of the substrate layer to form the light guide dots via cooperation of the pressing roller with the imprinting roller; and
    a recombining device disposed between the hot press printing device and the receiving roller for recombining the protective layer separated by and coming from the separating device and the substrate layer coming from the hot press printing device and having light guide dots impressed on the surface thereof, wherein
    the roll of the raw material is released from the feeing roller, then passes through the separating device so as to separate the protective layer from the substrate layer of the raw material, the hot press printing device so as to form light guide dots on the surface of the separated substrate layer and the recombining device so as to recombine the separated protective layer from the separating device and the substrate layer from the hot press printing device, and finally reeled by the receiving roller to finish the manufacturing of the light guide film.

2. The apparatus for manufacturing a light guide film according to claim 1, wherein the microstructure of the molding member is a microstructure or nanostructure in a raster shape or a cylindrical microlens structure.

3. The apparatus for manufacturing a light guide film according to claim 1, wherein both ends of the molding member are inserted into a gap formed in the imprinting roller such that the molding member is attached to the imprinting roller and extended circumferentially around the imprinting roller by 360 degrees.

4. The apparatus for manufacturing a light guide film according to claim 1, wherein each of two ends of the molding member is provided with a fixture, and the molding member is fixed around the imprinting roller with the fixtures and extended circumferentially around the imprinting roller by 180 degrees.

5. The apparatus for manufacturing a light guide film according to claim 4, wherein the pressing roller comprises a first pressing roller and a second pressing roller which are provided at two sides of the imprinting roller respectively, wherein a first impression area formed on the light guide film by the cooperation of the first pressing roller and the printing roll and a second impression area formed on the light guide film by the cooperation of the second pressing roller and the printing roll are complementary with each other to form continuous light guiding dots on the light guide film.

6. The apparatus for manufacturing a light guide film according to claim 1, wherein the separating device further comprises:
    a trimmer for cutting off redundant edges of the protective layer; and
    a recycling roller for recycling the edges cut off.

7. The apparatus for manufacturing a light guide film according to claim 1, wherein the hot press printing device further comprises a pressure control system which controls the pressure between the pressing roller and the imprinting roller.

8. The apparatus for manufacturing a light guide film according to claim 1, wherein the hot press printing device further comprises a temperature control system which heats and controls a heating temperature of the pressing roller or the imprinting roller.

9. The apparatus for manufacturing a light guide film according to claim 1, further comprises:
    front and rear correction systems having edge sensors disposed on the feed roller and the receiving roller respectively and a transport correction device connected to axes of the feed roller and the receiving roller respectively, wherein the transport correction device control the feeding roller or the receiving roller to move inwardly when the raw material is sensed by the edge sensors to offset inwardly, and to move outwardly when the raw material is sensed by the edge sensors to offset outwardly.

10. The apparatus for manufacturing a light guide film according to claim 1, further comprising:
    a tension control system comprising a tension sensing device and a magnetic powder clutch device, wherein when the tension sensing device detects that the tension of the film during transportation is larger than a predetermined value, a rotating speed of the receiving roller is reduced by controlling the clutch device, and when the tension is less than the predetermined value, the rotating speed is increased by controlling the magnetic powder clutch device.

* * * * *